Malapert & DesCourtis.
Thermometer.
Nº 50,669.  Patented Oct. 24, 1865.
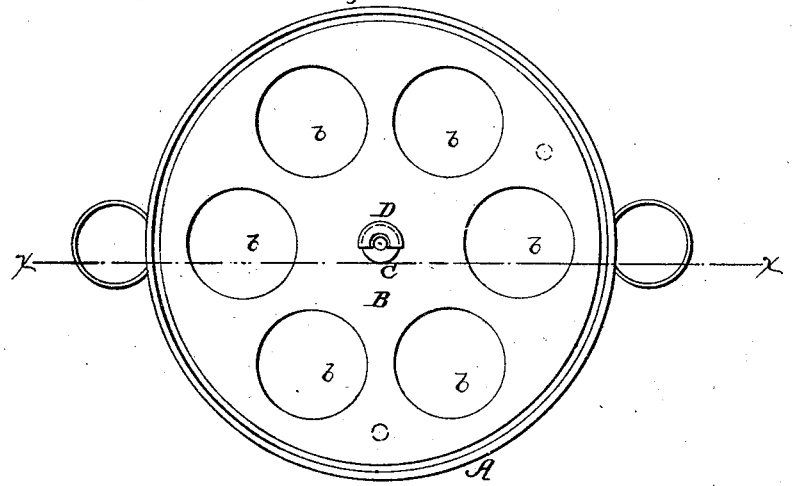
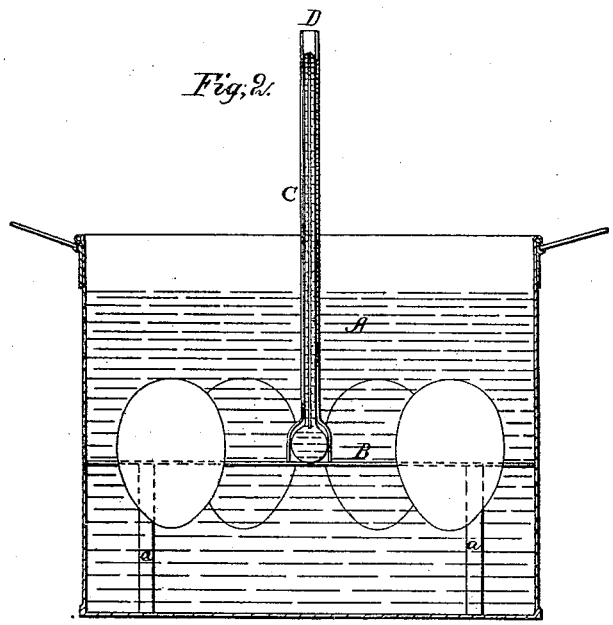
Witnesses:
Inventors:

UNITED STATES PATENT OFFICE.

PROSPER MALAPERT, OF POITIERS, FRANCE, AND EDWARD A. DES COURTIS, OF NEW YORK, N. Y.

IMPROVEMENT IN EGG-BOILERS.

Specification forming part of Letters Patent No. 50,669, dated October 24, 1865.

*To all whom it may concern:*

Be it known that we, PROSPER MALAPERT of Poitiers, France, and EDWARD A. DES COURTIS, of the city, county, and State of New York, have invented a new and Improved Egg-Boiler; and we do hereby declare that the following is a full, clear, and exact description thereof, which will enable those skilled in the art to make and use the same, reference being had to the accompanying drawings, forming part of this specification, in which—

Figure 1 is a plan or top view of an ordinary egg-boiler, showing our invention applied thereto. Fig. 2 is a vertical section of the same, taken in the line $x$ $x$, Fig. 1.

Similar letters of reference indicate like parts.

Our invention consists in the employment or use, in connection with an egg-boiler of any suitable construction, of a thermometer for indicating the temperature of the water contained in the vessel.

To enable others to understand our invention, we will proceed to describe it.

To show the application of our invention we have illustrated an egg-boiler in common use, which we will briefly describe.

A represents a metallic vessel, and B a metallic plate or diaphragm having a number of holes, $b$ $b$, made through it for holding the eggs to be boiled, and the plate B is provided with legs, which, when it is placed in the vessel A, will rest upon the bottom thereof, and thus keep the eggs at the proper place in the vessel to be boiled.

To the plate B, near the center thereof, a hollow stem, D, is attached, which is capable of receiving within it a thermometer, C, for indicating the temperature of the water in which the eggs are to be boiled.

The thermometer may be a mercurial thermometer or any other kind suitable for the purpose.

Instead of arranging the thermometer in the stem D, it may be otherwise attached or secured to the vessel. There are many ways for applying it so as to make it answer the desired purpose. The stem D serves the purpose of a handle by which to lift out the plate B, containing the eggs, after the latter have been boiled or cooled, as desired.

The use of a thermometer in connection with an egg-boiler will indicate the temperature of the water, and thus a great deal of waiting and watching will be avoided in this respect.

What we claim as our invention, and desire to secure by Letters Patent, is—

The application of a thermometer to an egg-boiler for the purpose of indicating the temperature of the water, as herein specified.

PROSPER MALAPERT.
EDWARD DES COURTIS.

Witnesses for Des Courtis:
M. M. LIVINGSTON,
FRANCIS JONES.

Witneses for Malapert:
CH. TEXEREANY,
L. MEYER.